(12) United States Patent
Curtin

(10) Patent No.: US 8,215,230 B2
(45) Date of Patent: Jul. 10, 2012

(54) COLLAPSIBLE SALAD SPINNER

(75) Inventor: Heather Curtin, Renton, WA (US)

(73) Assignee: Progressive International Corporation, Kent, WA (US)

( * ) Notice: Subject to any disclaimer, the term of this patent is extended or adjusted under 35 U.S.C. 154(b) by 584 days.

(21) Appl. No.: 12/329,264

(22) Filed: Dec. 5, 2008

(65) Prior Publication Data

US 2010/0139503 A1    Jun. 10, 2010

(51) Int. Cl.
 *A47J 37/10* (2006.01)
(52) U.S. Cl. ............... 99/495; 99/501; 99/511
(58) Field of Classification Search ......... 99/501, 99/495, 485, 516, 520, 521, 510; D7/665; 34/58

See application file for complete search history.

(56) References Cited

U.S. PATENT DOCUMENTS

| | | | |
|---|---|---|---|
| 3,885,321 A * | 5/1975 | Fouineteau | 34/58 |
| D260,346 S | 8/1981 | Lebowitz | |
| 5,490,454 A | 2/1996 | Ancona et al. | |
| D379,289 S | 5/1997 | Jeppesen et al. | |
| 5,865,109 A | 2/1999 | Bull | |
| 5,904,090 A | 5/1999 | Lillelund et al. | |
| 6,018,883 A * | 2/2000 | Mulhauser | 34/58 |
| D433,884 S | 11/2000 | Fujimoto | |
| 6,622,618 B1 | 9/2003 | Glucksman et al. | |
| D486,999 S | 2/2004 | de Groote et al. | |
| 6,899,021 B2 | 5/2005 | Riede | |
| D542,603 S | 5/2007 | Hood | |
| 7,654,402 B2 * | 2/2010 | Kusuma et al. | 220/8 |
| 2004/0168583 A1 | 9/2004 | Riede | |
| 2006/0037211 A1 * | 2/2006 | Herren | 34/108 |
| 2007/0181489 A1 | 8/2007 | Lee | |
| 2007/0251874 A1 | 11/2007 | Stewart | |
| 2008/0011671 A1 | 1/2008 | Syrkos | |
| 2008/0099476 A1 | 5/2008 | Fung | |
| 2008/0223226 A1 * | 9/2008 | Holcomb et al. | 99/495 |
| 2008/0230462 A1 * | 9/2008 | Curtin | 210/232 |

FOREIGN PATENT DOCUMENTS

| | | |
|---|---|---|
| CA | 2602253 | 12/2008 |
| CN | 201119807 | 9/2008 |
| CN | 201160796 | 12/2008 |
| CN | 201167889 | 12/2008 |
| EP | 0384179 | 8/1990 |
| EP | 2008560 | 12/2008 |
| FR | 1012262 * | 7/1952 |
| RU | 2059399 * | 5/1996 |
| WO | 2008103183 | 8/2008 |
| WO | 2009023892 | 2/2009 |

* cited by examiner

*Primary Examiner* — Gene Kim
*Assistant Examiner* — M Chambers
(74) *Attorney, Agent, or Firm* — Lowe Graham Jones PLLC

(57) ABSTRACT

A collapsible salad spinner includes a bowl, basket, and lid. Each of the bowl and basket are formed such that they are collapsible, with the bowl and basket being collapsible while nested within one another.

18 Claims, 4 Drawing Sheets

COLLAPSIBLE SALAD SPINNER

FIELD OF THE INVENTION

This invention relates generally to salad spinners.

BACKGROUND OF THE INVENTION

Salad spinners are commonly used to dry salad leaves, herbs, or other similar food items. A typical salad spinner generally includes an external bowl supporting an internal basket. The basket is supported in a manner in which it can spin within the bowl, thereby propelling items within the basket toward the perimeter of the basket. Water attached to lettuce leaves is likewise flung to the perimeter where it is expelled through holes in the basket while being retained within the bowl. Consequently, the leaves or other items within the bowl are dried.

One problem with salad spinners is that they are bulky and therefore inconvenient to store. This inconvenience is magnified for those who tend to use them only infrequently, consuming a significant amount of space for an item that is used on an occasional basis. Nonetheless, there has been no solution to this problem.

SUMMARY OF THE INVENTION

The present invention comprises a salad spinner in which the bowl and basket are collapsible in order to reduce the size of the salad spinner for storage. In the preferred version, the salad spinner includes an external bowl, an internal basket, and a lid. A mechanism is included for causing the basket to spin, and most conveniently the mechanism is provided on or within the lid. In other versions, the spinning mechanism is carried on the bowl, the basket, or external to the salad spinner.

Most preferably, each of the bowl and basket includes a rigid rim and base with a flexible material between the rim and the base. The flexible material may be food grade silicone and includes one or more living hinges to facilitate collapsing.

In accordance with some examples of the invention, the rigid portion of the basket includes openings to allow water to be expelled.

In accordance with other examples of the invention, the basket is carried above a central lug formed in the bowl, the lug having a height above the floor of the bowl that is sufficient to allow water to pool below the basket.

These and other examples of the invention will be described in further detail below.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
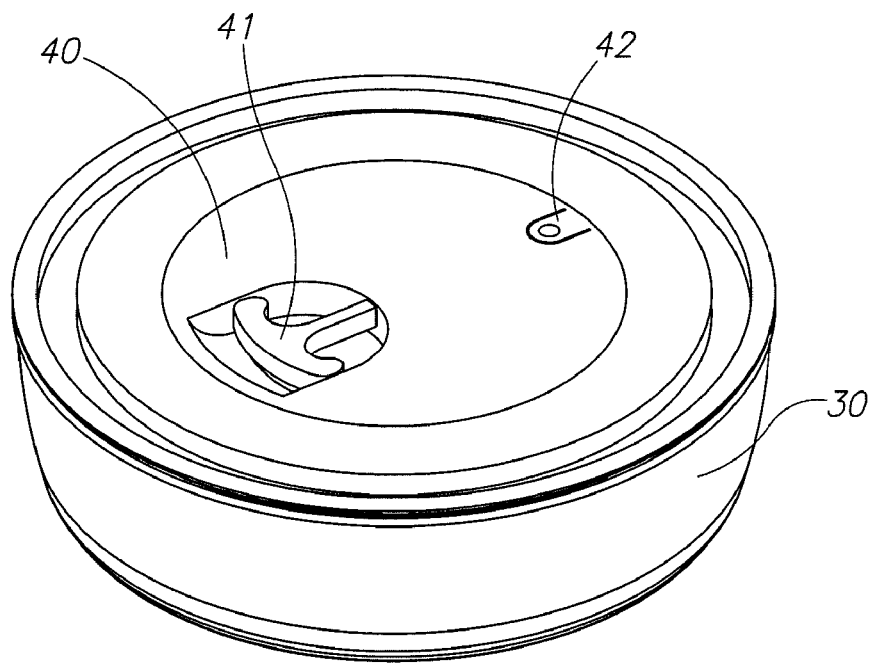
FIG. 1 is a perspective view of a preferred salad spinner, shown in a collapsed position.

Preferred examples of the salad spinner in accordance with the invention are described below and with reference to the figures in which common reference numbers are assigned to all of the figures. As shown, the salad spinner includes a basket 20 retained within a bowl 30 that is covered by a lid 40.

The bowl 30 includes a substantially rigid rim 31 and a substantially rigid base 32, with a flexible center section extending between the base and the rim. The center section is preferably formed from a flexible membrane 33 attached to the base and the rim such that together the base, rim, and center membrane form the container. Preferably, the center section is formed from a single material extending between the rim and the base, and most preferably, the material is a food-grade material such as silicone so that the container can be used with food items. Although the preferred bowl is configured with a rigid rim and base, in other versions the entire bowl may be formed from a relatively flexible material.

As shown, the membrane 33 includes an upper edge 34, a lower edge 35, and a central band 36, the central band being separated from the upper edge and lower edge by a pair of living hinges 37, 38. The central section is preferably formed integrally with the flexible membrane 33 from flexible material having a substantially uniform thickness within the region of that section. The thickness and material is chosen to provide a sufficient degree of rigidity such that the container will not collapse under its own weight when extended into the expanded position. In some examples of the invention, the height of the central section is approximately half the height of the membrane overall. In alternative versions, a portion the central band 36 may be formed from a less flexible material (such as plastic) with flexible membranes connecting the central band to the rim and base.

In the preferred version the living hinges 37, 38 are created within the membrane of the central section 33 by forming one or more portions about the membrane that are more likely than the rest of the membrane to fold under force. In one example, each folding section includes several alternating convex and concave ridges about the entire perimeter of the membrane. Alternately, the folding sections may be regions of thinner material, may be scored, have surrounding thickened regions, or otherwise be fashioned to urge the membrane to fold in the vicinity of the folding region. In this fashion, each of the folding sections serves as a living hinge that is configured to be more willing to fold than other portions of the central band 36.

In yet other versions of the invention, different configurations allow the bowl to be collapsible. Thus, for example, the bowl may be formed from plastic and include a plurality of living hinges or other folding locations, without the inclusion of a flexible membrane. As another alternative, the bowl may be formed from concentric rings allowing for a telescoping arrangement. These or other constructions may be used in order to provide a bowl that is collapsible from a first extended position in which it can be used as a bowl and a second collapsed position in which the height of the bowl has been reduced.

In the preferred embodiment, the membrane 33 is formed from silicone and the base 32 and rim 31 are each formed from plastic, with the membrane being over-molded onto the rim and the base. The membrane may alternatively be formed from other flexible materials such as thermoplastic elastomers, and may be glued or otherwise adhered to the base and rim. Likewise, the rim and base may alternatively be formed from other rigid or semi-rigid materials such as metals, ceramics, or wood.

The base 32 includes a lower flange on the exterior surface that provides a plane surface for the bottom of the bowl. In some versions, the lower flange may include a layer of silicone or other non-skid materials. Likewise, in some versions the bowl may include one or more feet rather than a peripheral flange or, alternatively, may simply have a flat bottom.

An inner surface of the bowl includes a centrally located lug 39. The lug 39 serves as a pivot axis and supports the basket 20 in order to allow the basket to spin within the bowl while maintaining the basket above the floor of the bowl. In other versions different structures can be used to perform this function. For example, the basket can be suspended by the lid or carried on the rim of the bowl. As another example, the basket can be supported by an annular flange rather than a lug, or can be supported by a lug extending downward from the bottom of the basket rather than upward from the bowl. Preferably, some form of basket support is provided to facilitate spinning and/or to provide some clearance between the bottom of the basket and the bottom of the bowl.

Figure 2:
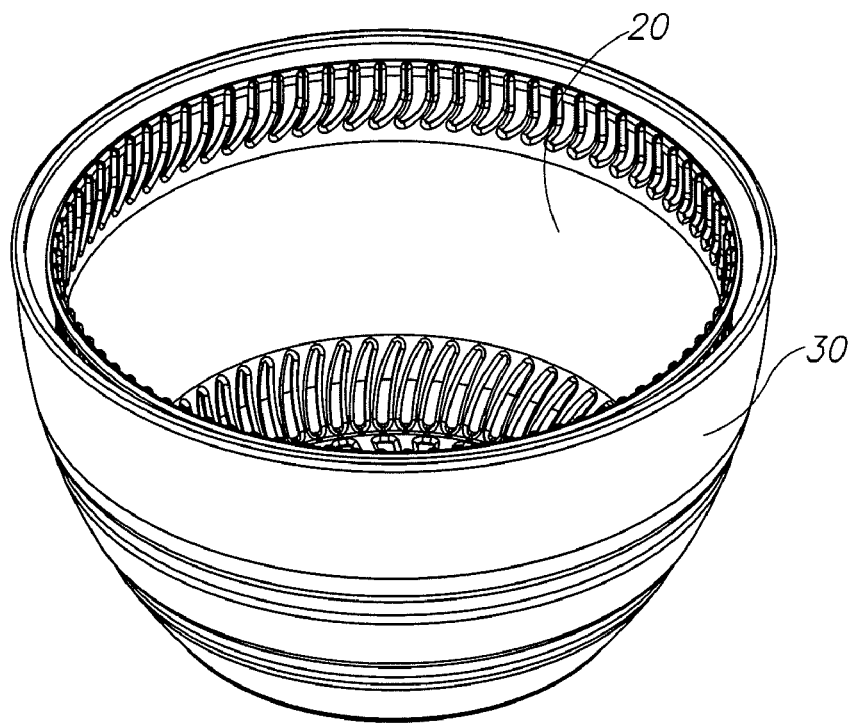
FIG. 2 is a perspective view of a preferred salad spinner, shown with the lid removed and the bowl and basket in an expanded position.
Figure 3:
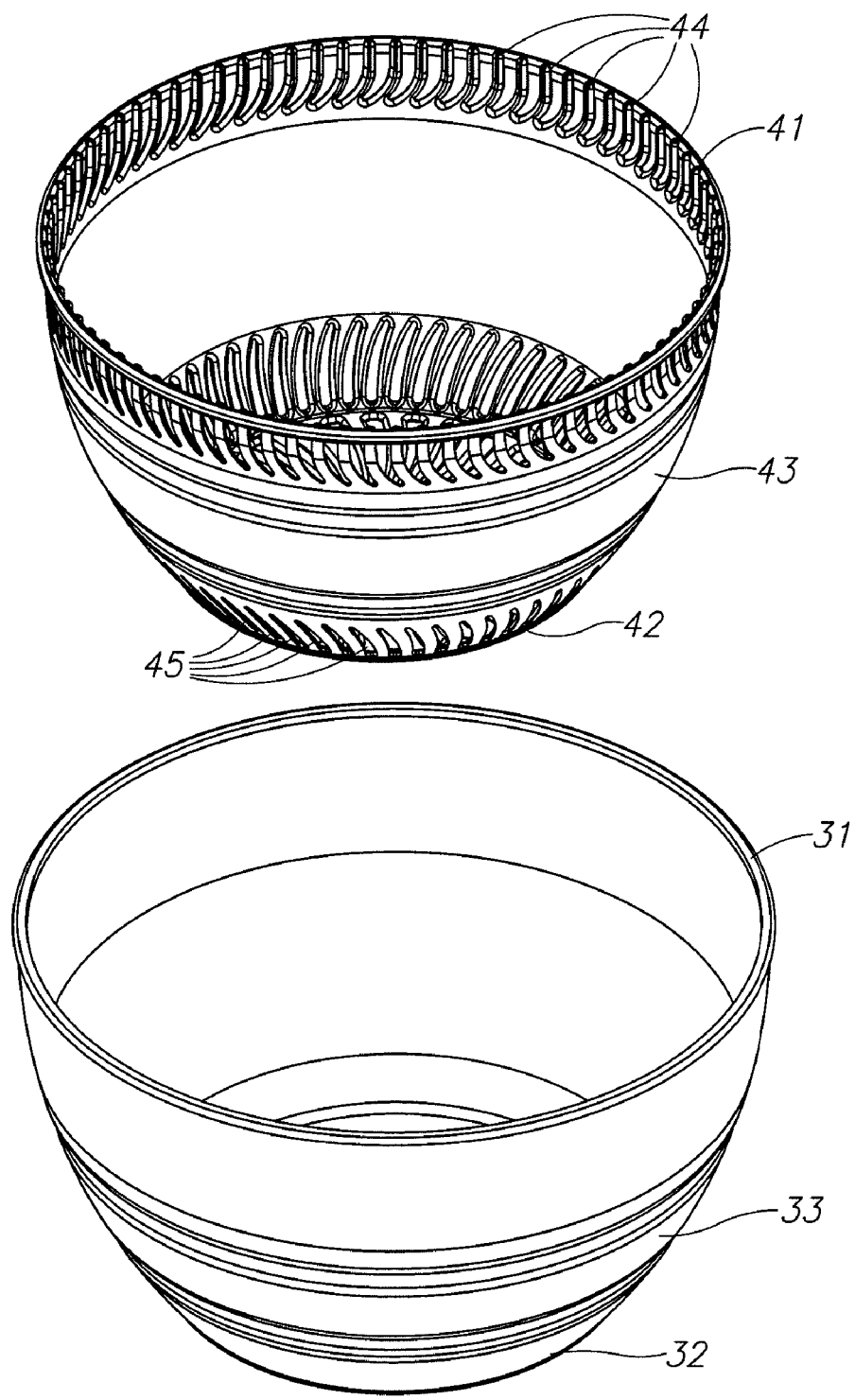
FIG. 3 is an exploded view of the bowl and basket of FIG. 2.
Figure 4:
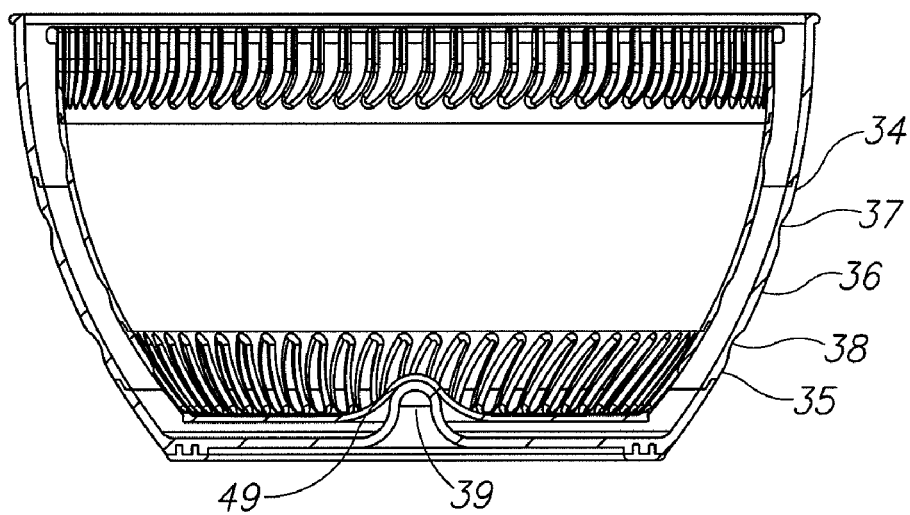
FIG. 4 is a sectional view of the bowl and basket of FIG. 2, the cross-section being taken vertically through a diameter defined across the rim of the bowl.
Figure 5:
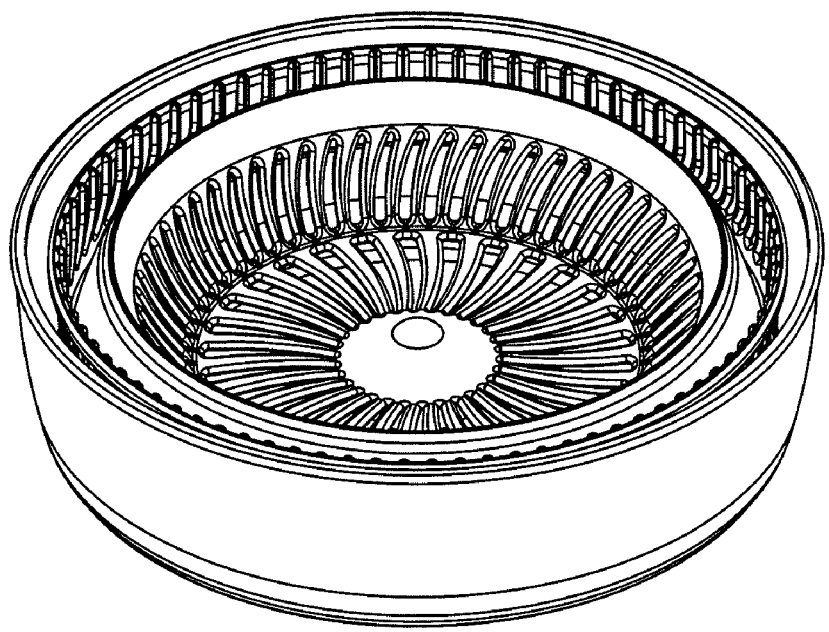
FIG. 5 is a perspective view of the bowl and basket of FIG. 2, shown in a collapsed position.
Figure 6:
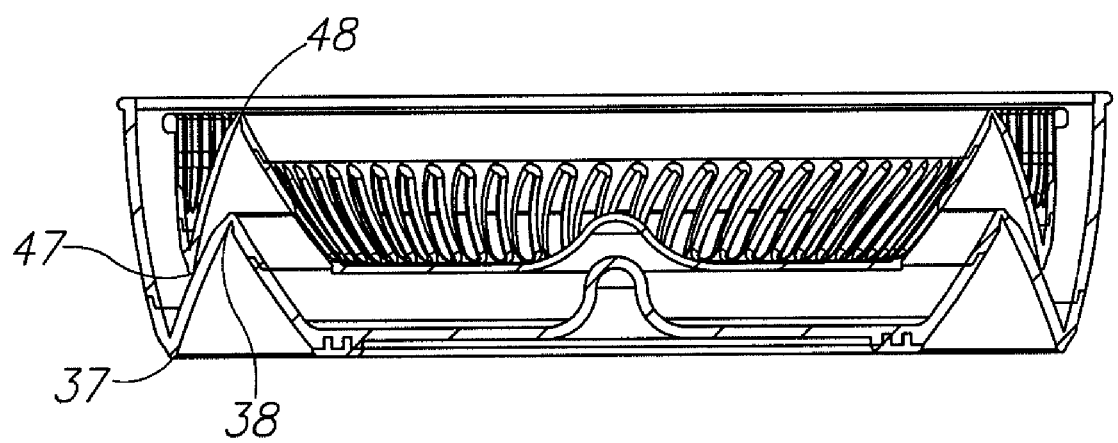
FIG. 6 is a sectional view of the bowl and basket of FIG. 2 shown in the collapsed position, the cross-section being taken along the same plane as that of FIG. 4.

The bowl can be expanded (as shown in FIGS. 2-4) or collapsed (as shown in FIGS. 1, 5, and 6). In the collapsed position, the height of the bowl is much shorter than in the expanded position, thereby making storage much more convenient. In order to collapse the container, a force is applied at the rim 31, with the force generally being in the direction from the rim toward the base. To expand the container, a force is applied to urge the rim upward while holding the base generally stationary.

The internal basket 20 is preferably formed in a fashion similar to that of the bowl, thereby making the inner basket collapsible. As shown in the figures, and best seen in FIG. 3, the basket includes an upper rim 41, a central section 43, and a base 42. In one version, the central section is formed from a flexible membrane, as with the bowl, and includes one or more living hinges to facilitate bending of the central section with respect to the upper rim and the base.

The upper rim 41 and base 42 of the basket are preferably formed from plastic. Ideally, the plastic is thick enough to provide structural support but thin enough so that the basket is lightweight and is able to spin at a relatively high rate of speed. Depending on the materials choice and the thickness, the rim and base of the basket may be flexible, semi-flexible, or rigid. The central membrane secures to the rim and the base of the basket in the same fashion as that of the bowl, via over-molding, adhesives, or some other suitable means.

The upper rim 41 of the basket may include a plurality of openings 44, as shown. Depending on the nature of the mechanism used to cause the lid to spin, the lid may also have a surface that interacts with the lid to allow a gear within the lid to engage corresponding teeth formed in the rim to spin the basket. In one example, the openings in the lid serve as gear teeth for this function. In other versions, separate teeth, flanges, projections, apertures, or the like may be used to provide an interface between the basket and the lid. In yet other examples, a frictional engagement is provided in which there are no corresponding teeth or gears. As noted above, any mechanism is possible for causing the basket to spin within the bowl, and therefore no teeth or the like are required.

The base 42 of the basket 40 includes a plurality of holes 45 to allow water to drain from the basket as the basket spins. In the version as shown, the holes are somewhat angled or scalloped. Any size or shape of holes is possible, consistent with the invention. The diameter of the basket is smaller than that of the bowl, and preferably sufficiently smaller to allow the basket to smoothly rotate within the bowl while allowing enough space for water to be retained in space between the bowl and the basket.

In the version as shown, the basket has holes in the base and rim but not the membrane. In other versions, the central membrane also includes one or more holes to allow water to exit the basket during use. Likewise, the central band of the basket may be formed from a more rigid material such as plastic that is secured between the rim and base by flexible material forming a living hinge. In yet another alternative, the basket may be collapsible without the use of a living hinge, but rather can include a telescoping or other construction to facilitate collapsing.

As best seen in the sectional view of FIG. 6, the preferred location of the living hinges is configured to allow the basket to nest properly within the bowl as the basket and bowl are collapsed together. In the version shown, two living hinges are provided in each of the bowl and the basket. The lower living hinge 38 of the basket is formed at a location such that, when collapsed, the location of the folded lower living hinge 38 is below the top of the rim. The upper living hinge 37 is provided at a complementary location such that, when collapsed, the location of the folded upper living hinge 38 is approximately in the same plane as the bottom of the base.

The location of the lower living hinge 38 when folded provides some clearance beneath the rim of the bowl, allowing the basket to still fit within the bowl when collapsed. The locations for the living hinges of the basket are formed such that the basket can fit within the collapsed bowl while the top of the basket is approximately at or below the rim of the bowl. Thus, as shown in FIG. 6, the lower living hinge 48 of the basket, when folded, remains approximately at or below the level of the rim of the bowl. Likewise, the upper living hinge 47 of the basket is configured in a location such that the rim of the basket is maintained at or below the rim of the bowl. In the version as illustrated, the living hinges are thereby placed in locations that facilitate a nesting relationship between the basket and bowl when collapsed.

In the version as illustrated, a central portion of the bottom of the basket includes a raised portion defining a cavity 49 that mates with the lug 39 on the bowl. The cavity serves as a mount to enable the basket to spin while supported on the lug as a pivot point. In alternate embodiments the basket may have a lug that fits within a cavity on the bowl, or yet other configurations may be provided so that the basket can spin with respect to the bowl. In some versions, the basket may be suspended from the rim of the bowl (with or without a lug and cavity arrangement) or the basket may be suspended from the lid. Regardless of the configuration, the basket is configured to spin with respect to the bowl.

The salad spinner further includes a lid 40, as shown in FIG. 1. Most preferably, the lid is used to impart a spinning force on the basket, though in different versions a spinning mechanism may be provided in the bowl or the basket. Any of a variety of spinning mechanisms may be carried within the lid. In the version as shown, the lid includes a handle 41 having a cable that is connected to an internal axle. The axle is further connected to a plate or gear that engages a portion of the basket, causing the basket to spin upon pulling the handle. The lid may also include a brake 42, shown in the exemplary illustrated version in the form of a tab on the outside of the lid which, when pressed, imparts a frictional force on the plate to slow the spinning motion of the plate and therefore the basket.

Exemplary salad spinner lids are described in a number of prior patents, including U.S. Pat. No. 6,899,021, which is incorporated by reference. The lid of the '021 patent incorporates a drive that is spring-loaded and enables the rotational direction of the basket to be changed in order to introduce a shaking force. A lid in accordance with the '021 patent can be used as the lid of the present invention, together with the collapsible basket and bowl.

Yet other lids operate by a pump incorporated into the lid. The pump (or plunger) forms part of a drive assembly that reciprocates linearly and, typically, along an axis through the center pivot point defined by the lug 39. An example of such a lid is shown and described in U.S. Pat. No. 6,018,883, which is incorporated by reference. As the '883 patent describes, the plunger may be connected to a helical screw that is axially projected beneath the pump handle, with the screw being received within a nut or other structure that converts the vertical pumping action into a rotational force to cause the basket to spin.

Yet other lids may include a rotating knob extending externally from the lid, with the knob being secured for pivotal or rotational movement by the user. The knob is internally in communication with a plate or gear that causes the basket to spin upon rotation of the knob. These and many additional drive mechanisms are possible to cause the basket to spin within the bowl. As noted above, while these drive mechanisms are typically located on the lid and operate by manual force, they may be mounted elsewhere and can be motor-driven rather than manually operated.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A salad spinner, comprising:
   a bowl having a bowl rim, a bowl base, and a bowl sidewall between the bowl rim and the bowl base, the bowl further having a first bowl living hinge adjacent the bowl base and a second bowl living hinge adjacent the bowl rim; and
   a basket, the basket being nested within the bowl and defining an interior space, the basket having at least one opening to allow water to pass from the interior space through the basket, the basket further having a basket rim, a basket base, and a basket sidewall between the basket rim and the basket base, the basket further having a first basket living hinge adjacent the basket base and a second basket living hinge adjacent the basket rim;
   wherein the bowl and the basket are configurable between a first position in which the bowl and the basket are expanded and a second position in which the bowl and the basket are collapsed, the bowl in the collapsed position being folded at the first bowl living hinge and the second bowl living hinge, the basket in the collapsed position being folded at the first basket living hinge and the second basket living hinge, the basket further being nestable within the bowl in both the first position and the second position.

2. The salad spinner of claim 1, further comprising a lid, the lid being carried on a rim of the bowl and substantially enclosing the bowl and the basket when the bowl and the basket are in the first position and when the bowl and the basket are in the second position.

3. The salad spinner of claim 2, further comprising a drive mechanism mounted on the salad spinner, the drive mechanism being operable to cause the basket to spin within the bowl.

4. The salad spinner of claim 3, wherein the drive mechanism further comprises a handle mounted on the lid, the handle being attached to a first end of a cable, the second end of the cable being secured to an axle, the axle further being operably connected to a plate, the plate being in contact with the basket, whereby pulling the handle causes rotation of the plate and the basket within the bowl.

5. The salad spinner of claim 2, further comprising a lug projecting upward from an interior floor of the bowl and a cavity formed on the basket, the lug being received within the cavity whereby the basket is supported by the lug.

6. The salad spinner of claim 5, wherein the bowl sidewall further comprises a first flexible membrane extending between the bowl rim and the bowl base.

7. The salad spinner of claim 2, wherein when the bowl is in the second position the first bowl living hinge adjacent the bowl base is positioned below the bowl rim to define a space between the first bowl living hinge and the bowl rim.

8. The salad spinner of claim 7, wherein when the bowl and the basket are each in the second position and the basket is nested within the bowl, the first basket living hinge is positioned at a height at or below the bowl rim.

9. The salad spinner of claim 8, wherein when the bowl and the basket are each in the second position and the basket is nested within the bowl, the first basket living hinge is positioned at a height between the bowl rim and the first bowl living hinge.

10. The salad spinner of claim 9, further comprising a plurality of holes formed in the basket base.

11. The salad spinner of claim 10, further comprising a plurality of holes formed in the basket sidewall.

12. A salad spinner, comprising:
   a bowl having an upper bowl portion, a lower bowl portion, and a flexible bowl membrane between the upper bowl portion and the lower bowl portion, the bowl membrane having a lower bowl living hinge adjacent the lower bowl portion and an upper bowl living hinge adjacent the upper bowl portion; and
   a basket, the basket being nested within the bowl and defining an interior space, the basket having at least one opening to allow water to pass from the interior space through the basket, the basket further having a an upper basket portion, a lower basket portion, and a flexible basket membrane between the upper basket portion and the lower basket portion, the basket membrane further having a lower basket living hinge adjacent the lower basket portion and an upper basket living hinge adjacent the upper basket portion;
   wherein the bowl and the basket are configurable between an expanded position in which the bowl and the basket are expanded and a collapsed position in which the bowl and the basket are collapsed, the bowl in the collapsed position being folded at the upper bowl living hinge and the lower bowl living hinge, the basket in the collapsed position being folded at the upper basket living hinge and the lower basket living hinge.

13. The salad spinner of claim 12 wherein the upper bowl portion has a first height between the upper bowl living hinge and an upper rim of the bowl, and the upper basket portion has a second height between the upper basket living hinge and an upper rim of the basket, the first height being greater than the second height.

14. The salad spinner of claim 12, wherein when the bowl is in the collapsed position the lower bowl living hinge is positioned below an upper rim of the bowl to define a space between the lower bowl living hinge and the bowl upper rim.

15. The salad spinner of claim 14, wherein when the bowl and the basket are each in the collapsed position and the basket is nested within the bowl, the lower basket living hinge is positioned at a height at or below the bowl upper rim.

16. The salad spinner of claim 12, wherein when the bowl and the basket are each in the collapsed position and the basket is nested within the bowl, the basket upper living hinge is positioned at a height between the upper bowl living hinge and the lower bowl living hinge.

17. The salad spinner of claim 16, further comprising a lid, the lid being carried on the upper portion of the bowl and enclosing the bowl and the basket when the bowl and the basket are in the expanded position and when the bowl and the basket are in the collapsed position.

18. The salad spinner of claim 17, wherein the lower basket portion comprises a base and an upwardly extending sidewall, the at least one opening further comprising a plurality of through-holes, at least some of the plurality of through-holes being formed in both the base and in the sidewall, and further wherein the flexible basket membrane is devoid of through-holes.

* * * * *